United States Patent
Nitsch et al.

(10) Patent No.: US 9,423,013 B2
(45) Date of Patent: Aug. 23, 2016

(54) PLANETARY GEAR AND GROUP TRANSMISSION WITH PLANETARY GEAR

(71) Applicant: ZF Friedrichshafen AG, Friedrichshafen (DE)

(72) Inventors: Matthias Nitsch, Friedrichshafen (DE); Eckhardt Lubke, Friedrichshafen (DE); Bernard Hunold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/608,291

(22) Filed: Jan. 29, 2015

(65) Prior Publication Data
US 2015/0219193 A1  Aug. 6, 2015

(30) Foreign Application Priority Data
Feb. 5, 2014  (DE) .......................... 10 2014 202 080

(51) Int. Cl.
*F16H 3/44* (2006.01)
*F16H 37/04* (2006.01)

(52) U.S. Cl.
CPC ........ *F16H 37/046* (2013.01); *F16H 2037/049* (2013.01); *F16H 2200/2007* (2013.01); *F16H 2200/2038* (2013.01)

(58) Field of Classification Search
CPC ................................................. F16H 2003/442
USPC ........................................................ 475/903
See application file for complete search history.

(56) References Cited

U.S. PATENT DOCUMENTS

| 4,229,996 A * | 10/1980 | Hildebrand ........... F16H 47/085 475/55 |
|---|---|---|
| 4,802,375 A | 2/1989 | Stodt |
| 7,824,302 B2 | 11/2010 | Diosi et al. |
| 7,857,724 B2 | 12/2010 | Heinzelmann |
| 8,210,981 B2 | 7/2012 | Bauknecht et al. |
| 8,597,153 B2 | 12/2013 | Saitoh et al. |
| 2014/0315679 A1* | 10/2014 | Xu .......................... F16H 57/08 475/331 |

FOREIGN PATENT DOCUMENTS

| DE | 3543269 A1 | 6/1987 |
|---|---|---|
| DE | 44 22 900 A1 | 11/1994 |

(Continued)

OTHER PUBLICATIONS

German Search Report issued in corresponding German Patent Application No. 10 2014 202 080.8 mailed Jan. 12, 2015.

*Primary Examiner* — Tisha Lewis
(74) *Attorney, Agent, or Firm* — Davis & Bujold, PLLC; Michael J. Bujold

(57) ABSTRACT

Planetary gearsets (PS1, PS2) are coupled and arranged coaxially and radially offset relative to one another. Gearset (PS1) is arranged radially inside gearset (PS2) and each have a carrier on which planet gears (8, 12) respectively rotate. A support ring, having inner and outer teeth, is radially arranged between the planet gears (8, 12). A sun gear, which meshes with planet gears (8) which mesh with the inner teeth of the support ring, is radially within gearset (PS1). A ring gear, which meshes with planet gears (12) which mesh with inner teeth of the support ring, is radially outside gearset (PS2). The sun gear of gearset (PS1) is fixed to an input shaft. The carrier of gearset (PS1) is fixed to the ring gear of gearset (PS2) and mounted, via a radial-axial bearing, on the output shaft. The carrier of gearset (PS2) is fixed to an output shaft.

11 Claims, 2 Drawing Sheets

(56) References Cited

FOREIGN PATENT DOCUMENTS

| DE | 102005014592 A1 | 10/2006 |
| DE | 102008000428 A1 | 9/2009 |
| DE | 10 2013 202 045 A1 | 8/2014 |
| EP | 0 618 382 A1 | 10/1994 |
| EP | 1 825 168 B1 | 8/2007 |
| WO | 2014/121957 A1 | 8/2014 |

* cited by examiner

PLANETARY GEAR AND GROUP TRANSMISSION WITH PLANETARY GEAR

This application claims priority from German patent application serial no. 10 2014 202 080.8 filed Feb. 5, 2014.

FIELD OF THE INVENTION

The invention concerns a planetary gear set, in particular a planetary gear set in a group transmission in a motor vehicle, for example in a heavy-goods vehicle, which comprises a main transmission with at least one input shaft and a main shaft on the output side and at least one range group arranged downstream from the main transmission between the main transmission and an output shaft, the range group being of planetary design and comprising at least two shiftable gear ratio steps for different speed ranges as well as a reversing stage for a reverse driving range.

BACKGROUND OF THE INVENTION

Group transmissions with a multi-gear main transmission and at least one range group drive-connected downstream from the main transmission have been known for a long time and are preferably used in heavy-goods vehicles. Often, a multi-gear splitter group is also drive-connected upstream from the main transmission. By virtue of a usually two-step range group with a gear interval that is above the total gear interval of the main transmission approximately by an average gear interval between two consecutive gears of the main transmission, the spread of the transmission as a whole is approximately doubled and the total number of gears of the group transmission is also doubled. By virtue of a usually two-step splitter group with a gear interval corresponding to approximately half of an average gear interval between two successive gears of the main transmission, the gear intervals of the main transmission are halved and the total number of gears in the group transmission is again doubled. Thus, in combination with a three-gear main transmission with three forward gears and one reverse gear, a group transmission with a total of twelve forward gears and a maximum of four reverse gears is obtained. In combination with a four-gear main transmission comprising four forward gears and a reverse gear, a sixteen-gear group transmission with a total of sixteen forward gears and a maximum of four reverse gears is obtained.

Compared with a single transmission having a comparable number of gears and a similar gear gradation and spread, the group transmission has much more compact dimensions and is lighter. However, since many gear shifts in group transmissions require the changing of gears in more than one partial transmission and therefore take place in a relatively complex manner, shifting processes in most of the known group transmissions are either partially or fully automated.

A typical embodiment of a group transmission with a main transmission, a splitter group connected upstream from the main transmission and a range group connected downstream from the main transmission, is described in DE 44 22 900 A1. In this known group transmission the main transmission is of countershaft design, having two countershafts and one main shaft, between which shiftable spur gear stages are arranged and provide three forward gears and one reverse gear. The splitter group is also of countershaft design and comprises two spur gear stages, commonly known as shiftable input constants, which are arranged between the input shaft of the group transmission and the correspondingly extended countershafts of the main transmission. When the first input constant on the input side is engaged, the spur gear stage of the second input constant on the transmission side serves as a further shiftable spur gear stage of the main transmission. Furthermore, by the direct connection of the input shaft to the main shaft, a direct forward gear can be engaged. The range group is of planetary design and comprises a simple planetary gear set with a sun gear, a planetary carrier carrying a number of planetary gearwheels, and a ring gear, wherein the sun gear is connected in a rotationally fixed manner to the main shaft, the planetary carrier is connected rotationally fixed to the output shaft of the group transmission, and the ring gear can optionally either be securely fixed to the housing in order to engage a gear ratio for a driving range with lower speeds, or connected rotationally fixed to the output shaft in order to engage a gear ratio for a driving range with higher speeds.

Differing from the group transmission known from DE 44 22 900 A1 the splitter group can also be of planetary design and the range group of countershaft design. For example, from EP 0 618 382 B1 various embodiments of a group transmission are known, the transmission comprising a multi-gear main transmission of countershaft design and an auxiliary transmission connected downstream from the main transmission. The auxiliary transmission comprises a two-step splitter group and a two-step range group. In a first embodiment of the auxiliary transmission according to FIG. 2 of that document, the splitter group is of countershaft design whereas the range group is of planetary design, similar to the group transmission known from DE 44 22 900 A1. In a second embodiment of the auxiliary transmission according to FIG. 3 of the document, in contrast the splitter group is of planetary design and the range group is of countershaft design.

Finally, from EP 1 825 168 B1 a group transmission is known, which comprises a main transmission of countershaft design, a two-step splitter group also of countershaft design and connected upstream from the main transmission, and a range group of planetary design and connected downstream from the main transmission. In a manner known per se the range group is in the form of a simple planetary gear set with a sun gear, a planetary carrier carrying a number of planetary gearwheels, and a ring gear, the sun gear being connected in a rotationally fixed manner to the main shaft of the main transmission. Besides the engagement of two gear ratios for driving ranges with lower and higher driving speeds, in this range group a reversing stage can also be engaged for a reverse driving range.

When the driving range for lower driving speeds is engaged, the ring gear is locked onto the housing by a first shifting element and the planetary carrier is connected in a rotationally fixed manner to the output shaft of the group transmission by a second shifting element. When the reversing stage for the reverse driving range is engaged, the planetary carrier is locked onto the housing by the first shifting element and the ring gear is connected in a rotationally fixed manner to the output shaft by means of the second shifting element. When the driving range for high driving speeds is engaged, the first shifting element is in an open, neutral condition (with no shifting function) and the ring gear and the planetary carrier are connected in a rotationally fixed manner, via the second shifting element, to one another and to the output shaft.

By virtue of the shiftable reversing stage in the range group, advantageously there is no need to arrange a shiftable reversing stage in the main transmission; in other words the reversing stage present therein can be omitted or replaced by a spur gear stage for an additional forward gear. To carry out the shifting function of the range group, however, two shifting elements are needed, the first of which is in the form of a dual shifting element with two shift positions and a neutral position while the second shifting element is a triple shifting element with three shift positions, including a shift position with triple coupling. Thus, the range group design known from EP 1 825 168 B1 has the disadvantage that its structure is complex, in particular that of the second shifting element, and that it requires two shift actuators for the simultaneous actuation of the two shifting elements.

A group transmission of similar type having a range group comprising two planetary gear sets arranged coaxially with one another and radially one over the other is known from the previously unpublished DE 10 2013 202 045 A1. It is not known from that document how the two planetary gear sets are centered and mounted radially and axially relative to one another.

SUMMARY OF THE INVENTION

Accordingly, the purpose of the present invention is to propose a planetary gear set, in particular a planetary gear set in a group transmission of a motor vehicle, the transmission having a multi-gear main transmission and at least one range group of the type mentioned earlier, in drive connection with the main transmission and downstream therefrom, in which the shifting processes of the planetary gear set of the range group are more simple in comparison to the design known from EP 1 825 168 B1. Moreover, the design of the planetary gear set should be simple and built so as to withstand varying axial loads.

This objective is achieved by a planetary gear set having two planetary gear sets coupled to one another, which are arranged coaxially and radially in an offset configuration relative to one another with the first planetary gear set arranged radially inside the second planetary gear set, wherein each planetary gear set has a planetary carrier on which planetary gearwheels are mounted to rotate, wherein a support ring is arranged between the planetary gearwheels of the two planetary gear sets and has radially inner teeth such as for a ring gear and radially outer teeth such as for a sun gear, wherein a sun gear is arranged radially inside the first planetary gear set, with which the planetary gearwheels of the first planetary gear set mesh, wherein the planetary gearwheels of the first planetary gear set mesh with the ring-gear teeth of the support ring, wherein a ring gear is arranged radially outside on the second planetary gear set, wherein the planetary gearwheels of the second planetary gear set mesh with the ring gear and also with the sun-gear teeth of the support ring, wherein the sun gear of the first planetary gear set is connected in a rotationally fixed manner with a drive input shaft such as the main shaft of the main transmission, wherein the planetary carrier of the first planetary gear set is connected in a rotationally fixed manner to the ring gear of the second planetary gear set, wherein the planetary carrier of the second planetary gear set is connected in a rotationally fixed manner to the output shaft, and wherein the planetary carrier of the first planetary gear set is mounted on the output shaft by means of a bearing arrangement that withstands both radial forces and axial forces in both directions.

In this planetary transmission, the two planetary gear sets, which are arranged nested axially and radially relative to one another, are optimally centered axially and radially relative to one another by the bearing arrangement. Axial forces occurring during operation are absorbed by the bearing arrangement and ultimately transferred into a transmission housing by way of the output shaft.

The bearing arrangement which absorbs both radial and axial forces in both directions can preferably consist of a pair of conical-roller bearings that are arranged in mirror-image relationship. Likewise, the bearing arrangement can be in the form of a two-row radial spherical roller bearing, a two-row angular contact ball bearing or a combined needle-axial ball bearing.

In another further development of the invention, it can be provided that the support ring having the sun-gear teeth and the ring-gear teeth for engaging a driving range with lower driving speeds can be locked to the housing by means of a first shifting clutch, whereas to engage a driving range with higher driving speeds two elements of the two planetary gear sets can be connected in a rotationally fixed manner to one another by means of a second shifting clutch, and the planetary carrier of the first planetary gear set can be locked to the housing by means of a third shifting clutch in order to engage a reverse driving range.

In addition, the objective mentioned earlier is achieved by a group transmission having a planetary transmission of the type defined above, wherein the first shifting clutch and the second shifting clutch of the group transmission are combined in a dual shifting element.

In this case, the main transmission can be in the form of a countershaft transmission with a single input shaft, which can be connected on the input side thereof by a frictional clutch to the driveshaft of a drive engine and which, on the output side, can be selectively brought into driving connection with the main shaft by way of a plurality of shiftable spur gear stages with different gear ratios.

Furthermore, the invention starts from a group transmission of a motor vehicle known per se, for example one in a heavy-goods vehicle, in which the group transmission comprises a main transmission with at least one input shaft and a main shaft on the output side as well as a range group in drive connection with the main transmission on the output side downstream from the latter and arranged between the main shaft and an output shaft, the range group being of planetary design and comprising at least two shiftable gear ratio stages for different speed ranges and also a shiftable reversing stage for a reverse driving range.

By designing the range group in the form of two planetary gear sets coupled in the manner described and by virtue of the arrangement of the shifting clutches mentioned, the shifting mechanism of the range group is simplified so that to engage the gear ratio stages for the two speed ranges and for the reverse driving range, only one of the shifting clutches has to be engaged. Thus, to actuate a shift in the range group only one shift actuator is required, which for a range shift is coupled with the shifting clutch concerned in a selection process. Accordingly, compared with the structure known from EP 1 825 168 B1, the shifting mechanism of the range group according to the present invention is substantially simpler. By virtue of the two coupled planetary gear sets, however, it entails acceptance of a rather more complex structure of the range group, requiring more fitting space. On the other hand, with the two planetary gear sets, a larger gear ratio spread of the range group than would be possible with only one planetary gear set is advantageously enabled.

When the driving range with lower driving speeds is engaged, i.e. when the first shifting clutch is engaged, the gear ratio of the range group is given by the equation: $i_{GP\_low}=(1-i_{01})*(i_{02}-1)/i_{02}$, wherein $i_{01}$ the fixed gear ratio of the first planetary gear set and $i_{02}$ is the fixed gear ratio of the second planetary gear set. Since when the driving range with higher driving speeds is engaged, i.e. when the second shifting clutch is engaged, the transmission elements of the two planetary gear sets are connected with one another and the two planetary gear sets then rotate as a block, the gear ratio of the range group in that case is equal to one ($i_{GP\_high}=1$). For this shift any two respective transmission elements of the two planetary gear sets can be connected rotationally fixed to one another by the second shifting clutch. However, a deviation from the above-described arrangement of the second shifting clutch only makes sense if thereby it can be positioned in a more favorable way. When the reverse driving range is engaged, i.e. when the third shifting clutch R is engaged, the gear ratio of the range group is given by the equation: $i_{GP\_rev}=i_{01} \times (i_{02}-1)$.

In this transmission axial fitting space is saved in that the two planetary gear sets of the range group are arranged in the same axial area coaxially and radially offset relative to one another, the first planetary gear set being arranged radially inside the second planetary gear set. In a space-saving way, this also enables the bearing arrangement that absorbs both radial and axial forces in both directions to be arranged in a bearing bore in the end of the output shaft, and the axial forces that act in one direction or the other, depending on the shift stage, to be transmitted to the output shaft which, for its part, is securely mounted in a transmission housing by means of radial and axial bearings.

Since the first and second shifting clutches of the range group are only engaged alternatively, these two shifting clutches are preferably combined in a dual shifting element, which simplifies the selection process, i.e. the coupling with the relevant shift actuator.

The range group with the characteristics of the invention can be combined with a main transmission designed as a countershaft transmission with a single input shaft, wherein the input shaft can be connected on the input side by a frictional clutch to the driveshaft of a drive engine while, on the output side, it can be brought into driving connection selectively with the main shaft by way of a plurality of shiftable spur gear stages with different gear ratios.

Likewise, the main transmission, with which the range group configured according to the invention is combined, can also be in the form of a dual-clutch transmission of countershaft structure with two input shafts, wherein the two input shafts can, in each case, be connected on the input side by a respective frictional clutch to the driveshaft of a drive engine and, on the output side, can be selectively brought into driving connection with the main shaft by way of a plurality of shiftable spur gear stages with different gear ratios.

Moreover the range group configured according to the invention can also be combined with other types of main transmissions, such as a main transmission of planetary design, provided that in each case they have at least one input shaft and a main shaft on the output side.

In an advantageous design, in order to engage the driving range with higher speeds by means of the second shifting clutch, the planetary carrier of the first planetary gear set can be connected in a rotationally fixed manner to the support ring having the sun-gear teeth of the second planetary gear set.

A further design provides that in order to engage the driving range with higher speeds by means of the second shifting clutch, the planetary carrier of the second planetary gear set can be connected in a rotationally fixed manner to the support ring having the ring-gear teeth of the first planetary gear set.

Besides the advantageous embodiment shown below, other designs too can be produced, in which, in order to engage the driving range with higher speeds by means of the second shifting clutch, the sun gear of the first planetary gear set can be connected in a rotationally fixed manner to the planetary carrier of the second planetary gear set, or the sun gear of the first planetary gear set can be connected in a rotationally fixed manner to the ring gear of the second planetary gear set.

BRIEF DESCRIPTION OF THE DRAWINGS

For the further clarification of the invention, the description is amplified by drawings of an example embodiment, which shows.

DETAILED DESCRIPTION OF THE PREFERRED EMBODIMENTS

Figure 1:
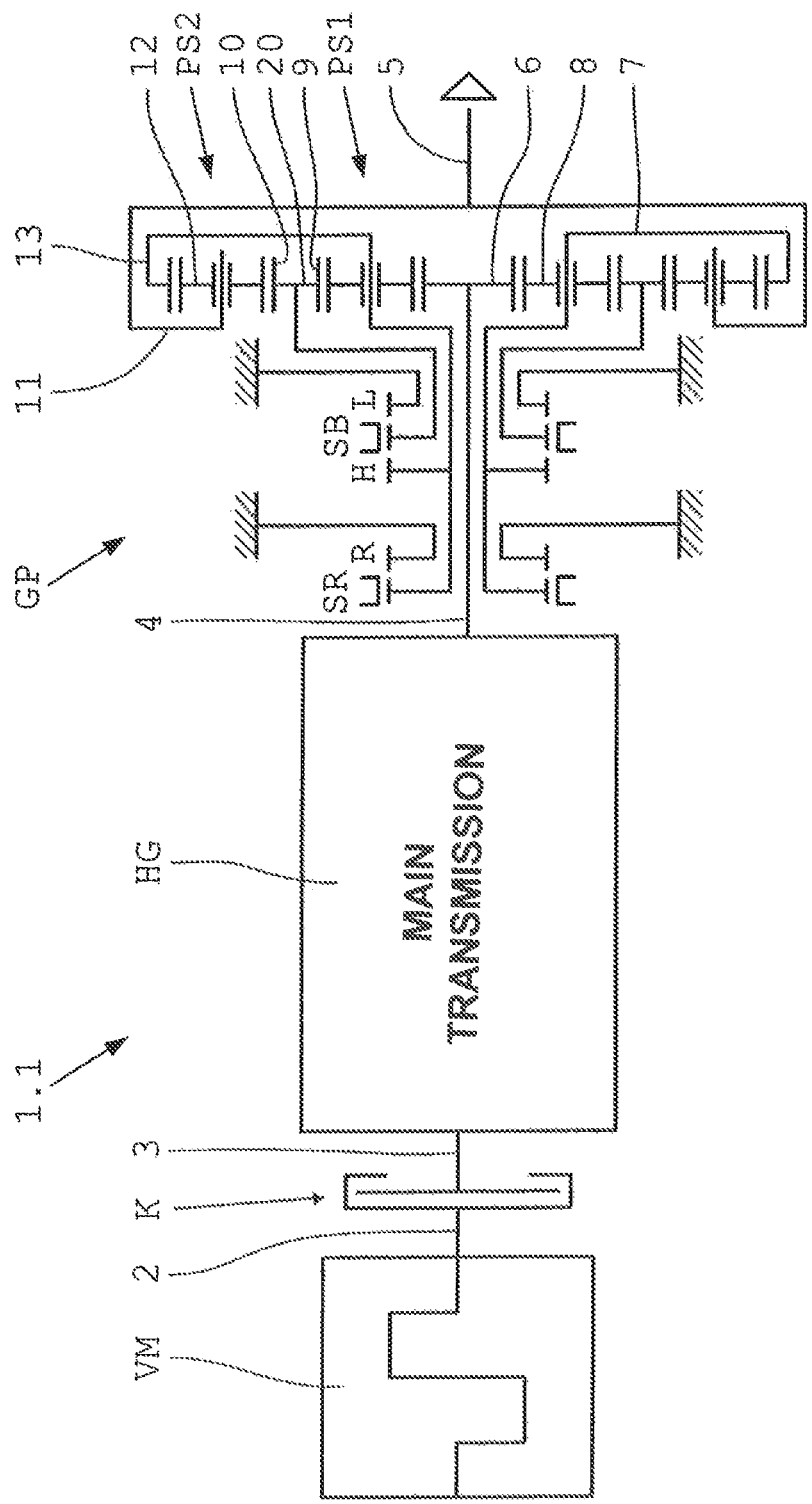
FIG. 1: A schematic view of a drive-train of a motor vehicle with a group transmission whose range group comprises two planetary gear sets axially and radially nested with one another.

The group transmission 1.1 represented schematically in FIG. 1 comprises a multi-gear main transmission HG (not shown in detail) and a range group GP in drive connection downstream from the main transmission HG. The main transmission HG has an input shaft 3 and on the output side a main shaft 4. The input shaft 3 can be connected, via a friction clutch K, to the driveshaft 2 of a drive engine VM in the form of an internal combustion engine. The range group GP is arranged between the main shaft 4 and an output shaft 5 which, in a manner not shown, is in driving connection with an axle drive such as an axle differential or a transfer box.

The range group GP is of planetary design and comprises two planetary gear sets PS1, PS2 coupled with one another and nested in one another. Radially on the inside is arranged a sun gear 6 having outer teeth that mesh with a number of planetary gearwheels 8 of the first, radially inner planetary gear set PS1. These planetary gearwheels 8 are mounted to rotate on a planetary carrier 7 of the first planetary gear set PS1. Radially on the outside, the planetary gearwheels 8 of the first planetary gear set PS1 mesh with ring-gear teeth 9 formed radially on the inside of a support ring 20. Radially on the outside, this support ring 20 has sun-gear teeth 10. The sun-gear teeth 10 mesh with the teeth of a plurality of planetary gearwheels 12 of the second planetary gear set PS2, which are mounted to rotate on a planetary carrier 11 of the second planetary gear set PS2. Radially on the outside, the planetary gearwheels 12 of the second planetary gear set PS2 mesh with the inner teeth of a ring gear 13 of the second planetary gear set PS2.

Figure 2:
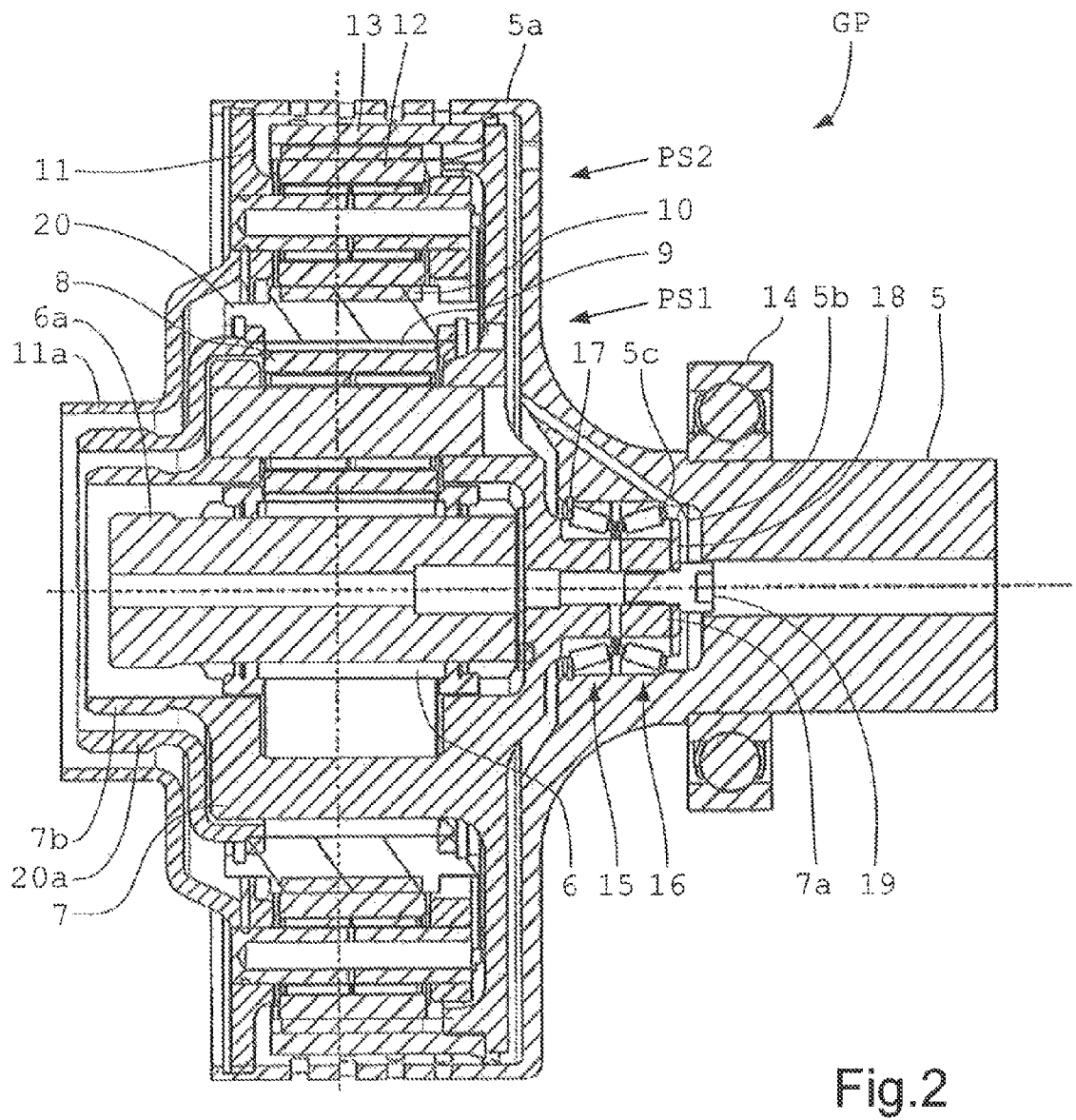
FIG. 2: A more detailed, sectioned view of the range group configured according to the invention.

The two planetary gear sets PS1, PS2 of the range group GP are arranged coaxially and radially offset relative to one another, with the first planetary gear set PS1 arranged radially inside the second planetary gear set PS2. As shown in particular by FIG. 2, the two planetary gear sets PS1, PS2 are contained in a bell-shaped housing 5a, for example made integrally with an output shaft 5 of the group transmission 1.1.

The planetary carrier 11 of the second planetary gear set PS2 is connected in a rotationally fixed manner to the bell-shaped housing 5a and has at its radially inner end a hollow-cylindrical bearing neck 11a that faces away from the output shaft 5. The bearing neck 11a serves to accommodate a bearing (not shown) which, together with the bearing arrangement 14 in the form of a ball bearing on the output shaft 5, supports the range group GP of the group transmission 1.1 on a transmission housing (not shown). The sun gear 6 of the first planetary gear set PS1 is, for example, made integrally with a sun gear shaft 6a which, for its part, is connected in a rotationally fixed manner (not shown) with the main shaft 4 of the main transmission HG. Thus, the sun gear shaft 6a forms the input element of the range group GP.

Radially on the inside and close to the drive output shaft, the planetary carrier 7 of the first planetary gear set PS1 has a shaft stub 7a, which is held in a bearing bore 5b at the end of the output shaft 5 by a bearing arrangement consisting of a mirror-symmetrical pair of conical-roller bearings 15, 16 which absorb axial and radial forces. The outer rings of the conical-roller bearing pair 15, 16 are held fast by a step 5c in the bearing bore 5b and a securing ring 17. The inner rings of the conical-roller bearing pair 15, 16 are secured onto the shaft stub 7a by means of a pressure disk 18 and a clamping screw 19, without any play or with a specifiable axial pre-stress.

The planetary carrier 7 of the first planetary gear set PS1 is connected in a rotationally fixed manner to the ring gear 13 of the second planetary gear set PS2. In a manner not illustrated, a hollow-cylindrical clutch neck 7b is connected in a rotationally fixed manner to a second shifting clutch H shown in FIG. 1 and to a single shifting element SR. The ring-gear teeth 9 on the support ring 20 are connected rotationally fixed to the sun-gear teeth 10 on the support ring 20, or, as illustrated, made integrally therewith. The support ring 20 has a hollow-cylindrical support ring neck 20a arranged between the clutch neck 7b and the bearing neck 11a; this neck 20a is connected in a rotationally fixed manner to a dual shifting element SB for the second shifting clutch H and for a first shifting clutch L fixed on the housing. The planetary carrier 11 of the second planetary gear set PS2 is connected in a rotationally fixed manner to the output shaft 5 and so forms the output element of the range group GP.

The sun-gear teeth 10 formed on the support ring 20 for the second planetary gear set PS2 and the ring-gear teeth 9 for the first planetary gear set PS1 connected rotationally fixed thereto can be locked onto the housing by means of the first shifting clutch L in order to engage a driving range with lower driving speeds, whereas to engage a driving range with higher driving speeds it can be connected in a rotationally fixed manner, via a second shifting clutch H, to the output shaft 5. The first shifting clutch L and the second shifting clutch H of the range group GP are combined in a dual shifting element SB, as already mentioned a short time ago.

To engage a reversing driving range, the planetary carrier 7 of the first planetary gear set PS1 and the ring gear 13 of the second planetary gear set PS2 connected rotationally fixed thereto can be locked onto the housing by means of a third shifting clutch R. In the present case the third shifting clutch R of the range group GP is part of a single shifting element SR.

Since in order to engage the gear stages for the two speed ranges and the reverse driving range in each case only one of the shifting clutches L, H, R is engaged, only one shift actuator is needed for actuating shifts in the range group GP, which, during a range shift, is coupled in a selection process with the shifting element SB, SR concerned.

When the first shifting clutch L is engaged, the transmission ratio of the range group GP is given by the equation $i_{GP\_low}=(1-i_{01})*(i_{02}-1)/i_{02}$, in which $i_{01}$ is the fixed transmission ratio of the first planetary gear set PS1 and $i_{02}$ is the fixed transmission ratio of the second planetary gear set PS2. When the second shifting clutch H is engaged the transmission ratio of the range group GP is equal to one $i_{GP\_high}=1$), since the transmission elements 6, 7, 9, 10, 11 and 13 of the planetary gear sets PS1, PS2 are then connected with one another in a rotationally fixed manner and rotate as a block. When the third shifting clutch R is engaged, the transmission ratio of the range group GP is given by the equation $i_{GP\_rev}=i_{01}*(i_{02}-1)$.

All the characteristics mentioned in the above description of the figures, in the claims and in the introduction to the description can be used both individually and in any desired combination with one another. Thus, the invention is not limited to the combinations of characteristics described and claimed here, but rather, all combinations of characteristics are to be considered as disclosed.

INDEXES 1.1 Group transmission
2 Driveshaft
3 Input shaft of the main transmission HG
4 Main shaft of the main transmission HG
5 Output shaft of the range group GP
5a Bell-shaped housing for the planetary gear set PS2
5b Bearing bore in the output shaft 5
5c Step in the bearing bore 5b
6 Sun gear of planetary gear set PS1
6a Sun gear shaft
7 Planetary carrier of the planetary gear set PS1
7a Shaft stub on the planetary carrier 7
7b Clutch neck on the planetary carrier 7
8 Planetary gearwheel of the planetary gear set PS1
9 Ring-gear teeth on the support ring 20 for the planetary gear set PS1
10 Sun-gear teeth on the support ring 20 for planetary gear set PS2
11 Planetary carrier of Planetary gear set PS2
12 Planetary gearwheel of planetary gear set PS2
13 Ring gear of planetary gear set PS2
14 Bearing arrangement on the output shaft 5
15 First conical roller bearing
16 Second conical roller bearing
17 Securing ring
18 Pressure disk
19 Clamping screw
20 Support ring for the ring-gear teeth 9 and the sun-gear teeth 10
20a Support ring neck
GP Range group
H Second shifting clutch of the range group GP
HG Main transmission
K Friction clutch
L First shifting clutch of the range group GP
PS1 First planetary gear set of the range group GP
PS2 Second planetary gear set of the range group GP
R Third shifting clutch of the range group GP
SB Dual shifting element of the range group GP
SR Single shifting element of the range group GP
VM Drive engine, internal combustion engine

The invention claimed is:
1. A planetary gear system in a group transmission (1.1) of a motor vehicle comprising:
a main transmission (HG) with at least one input shaft (3) and a main shaft (4) on an output side;

at least one range group (GP) is connected downstream from the main transmission (HG) between the main shaft (4) and an output shaft (5);

the range group (GP) being of planetary design and having at least two shiftable gear ratio steps for different speed ranges and a shiftable reversing stage for a reverse driving range, the planetary gear system comprises mutually coupled first and second planetary gearsets (PS1, PS2) arranged coaxially and radially offset relative to one another with the first planetary gearset (PS1) being arranged radially inside the second planetary gearset (PS2);

the first and the second planetary gearsets (PS1, PS2) each having a respective planetary carrier (7, 11) on which planetary gearwheels (8, 12) being mounted to rotate;

a support ring (20) having ring-gear teeth (9) radially on an inside thereof which form a ring gear of the first planetary gearset (PS1), and sun-gear teeth (10) radially on an outside thereof which form a sun gear of the second planetary gearset (PS2), the support ring (20) being arranged radially between the planetary gearwheels (8, 12) of the first and the second planetary gearsets (PS1, PS2);

the first planetary gearset (PS1) having a sun gear (6) which meshes with the planetary gearwheels (8) of the first planetary gearset (PS1) and is arranged radially on an inside of the first planetary gearset (PS1);

the planetary gearwheels (8) of the first planetary gearset (PS1) also meshing with the ring-gear teeth (9) of the support ring (20);

the second planetary gearset (PS2) has a ring gear (13) being arranged radially on an outside of the second planetary gearset (PS2);

the planetary gearwheels (12) of the second planetary gearset (PS2) meshing with the ring gear (13) of the second planetary gearset (PS2) and with the sun gear teeth (10) of the support ring (20);

the sun gear (6) of the first planetary gearset (PS1) being connected, in a rotationally fixed manner, to the main shaft of the main transmission (HG);

the planetary carrier (7) of the first planetary gearset (PS1) being connected, in a rotationally fixed manner, to the ring gear (13) of the second planetary gearset (PS2);

the planetary carrier (11) of the second planetary gearset (PS2) being connected, in a rotationally fixed manner, to the output shaft (5); and the planetary carrier (7) of the first planetary gearset (PS1) being mounted on the output shaft (5) by a bearing arrangement (15, 16) that absorbs both radial forces and axial forces.

2. The planetary gear system according to claim 1, wherein the bearing arrangement (15, 16) comprises a pair of conical roller bearings arranged mirror-symmetrically.

3. The planetary gear system according to claim 1, wherein the support ring (20), which comprises the sun-gear teeth (10) and the ring-gear teeth (9), is lockable to a housing by a first shifting clutch (L) in order to engage a low speed driving range, two elements of the first and the second planetary gearsets (PS1, PS2) are connectable, in a rotationally fixed manner, to one another by a second shifting clutch (H) in order to engage a high speed driving range, and the planetary carrier (7) of the first planetary gearset (PS1) is lockable to the housing by a third shifting clutch (R) in order to engage a reverse driving range.

4. A planetary gear system in combination with a group transmission (1.1) of a motor vehicle comprising:

a main transmission (HG) comprising at least one input shaft (3) and a main shaft (4) on an output side;

at least one range group (GP) being connected downstream from the main transmission (HG) between the main shaft (4) and an output shaft (5), the range group (GP) being of planetary design and having at least two shiftable gear ratio steps for different speed ranges and a shiftable reversing stage for a reverse driving range;

the planetary gear system comprising mutually coupled first and second planetary gearsets (PS1, PS2) arranged coaxially and radially offset relative to one another with the first planetary gearset (PS1) being arranged radially inside the second planetary gearset (PS2);

the first and the second planetary gearsets (PS1, PS2) each having a respective planetary carrier (7, 11) on which planetary gearwheels (8, 12) are mounted for rotation;

a support ring (20), having ring-gear teeth (9) radially on an inside thereof which form a ring gear of the first planetary gearset (PS1), and sun-gear teeth (10) radially on an outside thereof which form a sun gear of the second planetary gearset (PS2), and the support ring being radially arranged between the planetary gearwheels (8, 12) of the first and the second planetary gearsets (PS1, PS2);

the first planetary gearset has a sun gear (6), with which the planetary gearwheels (8) of the first planetary gearset (PS1) mesh, and which is arranged radially on an inside of the first planetary gearset (PS1);

the planetary gearwheels (8) of the first planetary gearset (PS1) also meshing with the ring-gear teeth (9) of the support ring (20);

the second planetary gearset has a ring gear (13) which is arranged radially on an outside of the second planetary gearset (PS2);

the planetary gearwheels (12) of the second planetary gearset (PS2) meshing with the ring gear (13) of the second planetary gearset and with the sun-gear teeth (10) of the support ring (20);

the sun gear (6) of the first planetary gearset (PS1) being connected, in a rotationally fixed manner, to the main transmission (HG);

the planetary carrier (7) of the first planetary gearset (PS1) being connected, in a rotationally fixed manner, to the ring gear (13) of the second planetary gearset (PS2);

the planetary carrier (11) of the second planetary gearset (PS2) being connected, in a rotationally fixed manner, to the output shaft (5);

the planetary carrier (7) of the first planetary gearset (PS1) being mounted on the output shaft (5) by a bearing arrangement (15, 16) that absorbs both radial forces and axial forces; and the range group (GP) comprising first and second shifting clutches (L, H) being combined in a dual shifting element (SB).

5. The planetary gear system in combination with the group transmission according to claim 4, wherein the main transmission (HG) is a countershaft transmission with a single input shaft (3), which is connectable to a driveshaft (2) of a drive engine (VM), on an input side, by a friction clutch (K), and which is selectively drive connectable with the main shaft (4), on an output side, by a number of shiftable spur gear stages with different gear ratios.

6. The planetary gear system in combination with the group transmission according to claim 4, wherein the planetary carrier (7) of the first planetary gearset (PS1) is connectable, in a rotationally fixed manner, to the support ring (20) that has the sun-gear teeth (10) of the second planetary gearset (PS2) for engaging a high speed driving range via the second shifting clutch (H).

7. The planetary gear system in combination with the group transmission according to claim 4, wherein the planetary carrier (11) of the second planetary gearset (PS2) is rotationally fixed connectable to the support ring (20) that has the ring-gear teeth (10) of the first planetary gearset (PS1) by the second shifting clutch (H) for engaging high speed driving range.

8. The planetary gear system in combination with the group transmission according to claim 4, wherein the sun gear (6) of the first planetary gearset (PS1) is connectable, in a rotationally fixed manner, to the planetary carrier (11) of the second planetary gearset (PS2) by the second shifting clutch (H) for engaging a high speed driving range.

9. The planetary gear system in combination with the group transmission according to claim 4, wherein the sun gear (6) of the first planetary gearset (PS1) is connectable, in a rotationally fixed manner, to the ring gear (13) of the second planetary gearset (PS2) by the second shifting clutch (H) for engaging a high speed driving range.

10. A planetary gear system of a group transmission for a vehicle having a main transmission with at least one input shaft and a main shaft on an output side thereof, and least one range group connected downstream from the main transmission between the main shaft and an output shaft of the group transmission, the range group being of a planetary design and having at least two shiftable gear ratio steps for a high speed driving range and a low speed driving range and a shiftable reversing stage for a reverse driving range, the planetary gear set comprising:
    first and second planetary gear sets being coaxially coupled to one another such that the first planetary gear set being radially nested within the second planetary gear set;
    the first planetary gear set comprising a sun gear, planetary gears and a carrier, the carrier of the first planetary gear set rotatably supporting the planetary gears of the first planetary gear set which mesh with the sun gear, and the sun gear of the first planetary gear set being rotationally fixed to the main shaft of the main transmission;
    the second planetary gear set comprising a ring gear, planetary gears and a carrier, the carrier of the second planetary gear set rotatably supporting the planetary gears of the second planetary gear set which mesh with the ring gear of the second planetary gear set, the ring gear of the second planetary gear set being rotationally fixed to the carrier of the first planetary gear set, and the carrier of the second planetary gear set being rotationally fixed to the output shaft of the group transmission;
    the carrier of the first planetary gear set being rotatably supported, via conical roller bearings, by the output shaft of the group transmission, the conical roller bearings being sloped radially inwardly, toward one another, so as to absorb both radial and axial forces directed between the carrier of the first planetary gear set and the output shaft of the group transmission; and
    a support ring having radially inner, ring-gear teeth which form a ring gear of the first planetary gear set and radially outer, sun-gear teeth which form a sun gear of the second planetary gear set, the support ring being arranged radially between the planetary gears of the first and the second planetary gear sets such that the ring-gear teeth engage the planetary gears of the first planetary gear set and the sun-gear teeth engage the planetary gears of the second planetary gear set.

11. The planetary gear system of a group transmission according to claim 1, wherein the range group comprises first and second shifting elements and first, second and third clutches;
    the first and the third clutches are rotationally fixed to a housing and the second clutch is rotationally fixed to the carrier of the first planetary gear set; and
    the first shifting element is rotationally fixed to the carrier of the first planetary gear set and is engagable with the first clutch to rotationally fix the carrier of the first planetary gear set to the housing;
    the second shifting element is engagable with the second clutch to rotationally fix the support ring to the carrier of the first planetary gear set; and
    the second shifting element is engagable with the third clutch to rotationally fix the support ring to the housing.

* * * * *